UNITED STATES PATENT OFFICE.

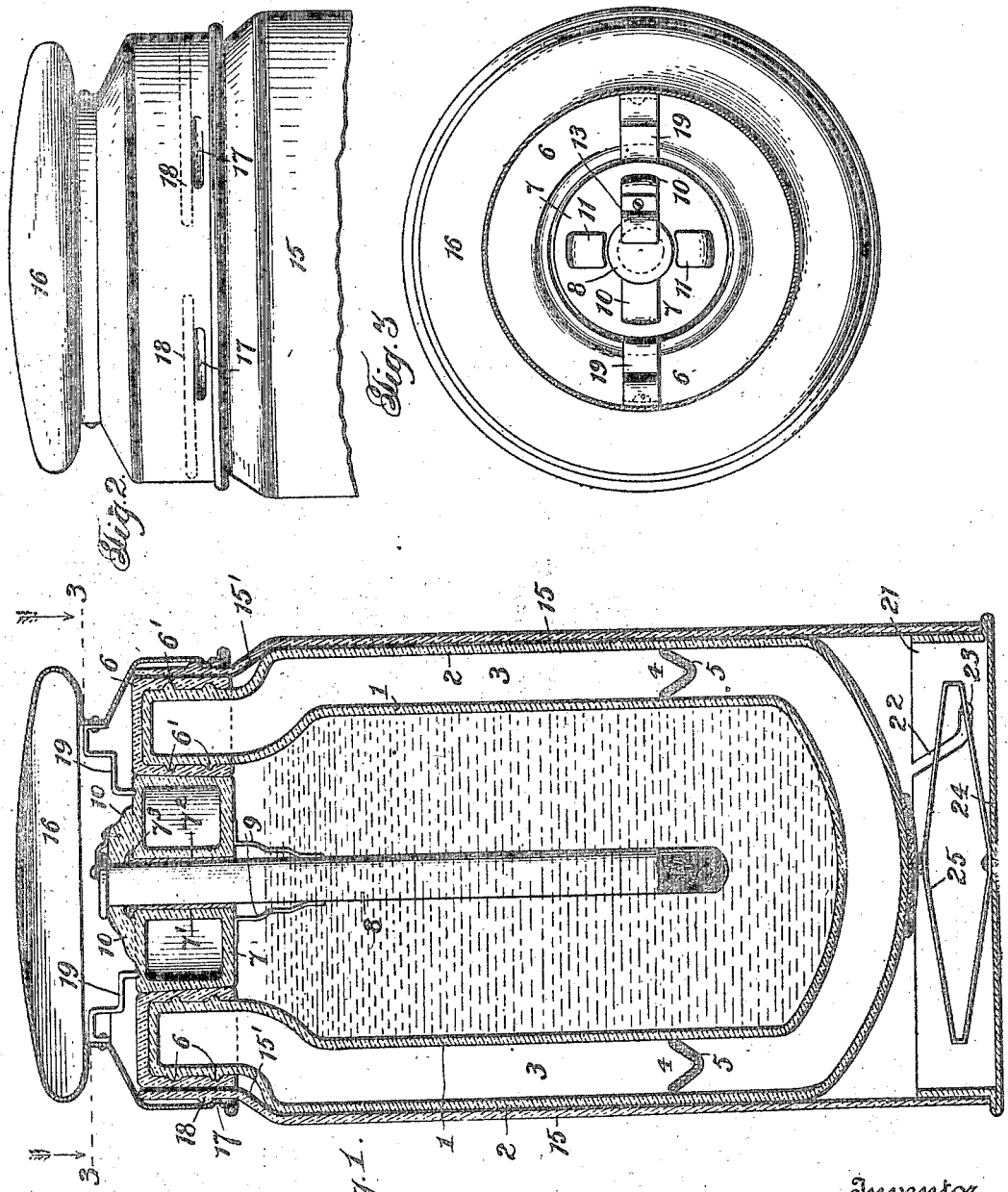

LOUIS CHARLES ROSENBERG, OF WASHINGTON, DISTRICT OF COLUMBIA.

PRESERVING-RECEPTACLE FOR MICRO-ORGANISMS.

1,234,219.  Specification of Letters Patent.  Patented July 24, 1917.

Application filed February 26, 1915. Serial No. 10,879.

*To all whom it may concern:*

Be it known that I, LOUIS CHARLES ROSENBERG, a citizen of the United States, residing at Washington, in the District of Columbia, have invented certain new and useful Improvements in Preserving-Receptacles for Micro-Organisms, of which the following is a specification, reference being had therein to the accompanying drawing.

This invention relates to an improved receptacle for preserving micro-organisms.

The primary object of the invention is to provide an improved, simple, compact device of this nature for the convenient transportation of micro-organisms capable of maintaining such micro-organisms at a substantially constant temperature for a considerable period of time and to exclude light therefrom so that the micro-organisms during transportation will be protected from destructive influences and the growth and multiplication thereof promoted, the device being particularly adapted for use by physicians in transporting bacteria in obtaining cultures for purposes of diagnosis.

The invention, with its advantages and the novel construction, combination and arrangement of parts comprising the same will be understood from the following detailed description when considered in connection with the accompanying drawings forming part hereof and illustrating one embodiment of the invention.

In the drawings:

Figure 1 is a vertical section of a device constructed in accordance with the present invention.

Fig. 2 is a side elevation of the upper portion of the outer casing or jacket.

Fig. 3 is a horizontal section on the line 3—3 of Fig. 1 and looking in the direction of the arrow.

In the drawings I have illustrated a preferred embodiment of the invention. In this connection I desire it to be understood that the invention, in its broadest aspect is not limited to the specific construction shown but that modifications and minor changes thereof may be made without departing from the spirit of the invention.

Referring to a detail description of the drawings, the construction shown comprises a vessel having inner and outer walls 1 and 2 spaced apart and united with each other at the mouth of the vessel and inclosing between them a vacuum space 3. Interposed between the walls of the vessel are resilient supporting and spacing members 4, said members preferably taking the V-shaped formation shown and each consisting of a thin flexible metal strip 5 provided with a heavy coating of flexible non-heat conducting material such as asbestos wool or the like. The receptacle is preferably constructed of glass and the opposing surfaces at the interior of the vacuum chamber are provided with the usual coating. A collar 6 of U-shape form in cross section embraces the walls of the receptacle at the mouth thereof, said collar serving to reinforce the vessel at this point, and the surface of the collar at the inner side of the mouth of the receptacle being preferably ground to make a close fit with the walls of a stopper 7 adapted to fit within and close the mouth of the receptacle. The collar 6 is secured in place by any suitable cement, said collar being provided with annular grooves 6' in the inner faces of the walls thereof in which the cement is adapted to enter and securely fasten the parts together.

8 designates a test tube adapted to have placed therein the bacteria with the culture medium, said test tube being adapted to be detachably connected with the vessel to extend within the same in spaced relation with the walls of the receptacle. The stopper 7, which is preferably formed hollow, as shown, is constructed to provide a support for the bacteria test tube, said stopper being provided with a central opening 7' in which the test tube is adapted to be seated and held to extend centrally within the interior chamber of the vessel. The walls of the opening 7' are preferably formed of glass provided with a lining 7² of rubber or the like, which is adapted to make a close fit with the walls of the test tube and also provide a yieldable support therefor. The rubber lining 7² is provided at its upper end with an outwardly extending annular flange 7³ adapted to engage the top wall of the stopper. Projecting from the lower wall of the stopper around the central opening thereof is a plurality of spring fingers 9 adapted to yieldably engage the test tube at their outer ends, said fingers acting to guide and hold the test tube in central position. The stopper at its top is provided with oppositely disposed lugs or raised portions 10 upon which is adapted to rest the flanged mouth of the test tube. The stopper is also provided with oppositely disposed raised portions 11 adapted to provide a grip in removing the stopper. Means is also provided for locking the test tube to the stopper, said means comprising a flat spring member 13 pivoted at one end at 12 to one of the lugs 10 and having an outer offset portion adapted to fit over and against the upper end of the test tube and hold the flanged mouth thereof pressed downwardly upon the supporting lugs 10, said spring member being adapted to be turned to engage or disengage the same from the upper end of the test tube.

The double walled vacuum vessel is adapted to receive a heat storing liquid, the liquid prior to its introduction into the vessel being heated to a temperature at which it is desired to keep the bacteria that is to be preserved. Water is usually employed for this purpose and the interior chamber of the vessel is filled with the liquid. Owing to the insulated character of the vessel, the liquid therein will be maintained at a substantially constant temperature for a considerable period of time, the bacteria in the test tube, which is immersed in the body of liquid being kept at a corresponding constant temperature.

The device is provided with an outer casing 15 constructed of metal preferably aluminum and having a lining 15' of soft material such as rubber, wool, or the like. The jacket is provided at its upper end with a removable closure cap 16, said cap is provided with a plurality of spaced inwardly projecting lugs 17 adapted to coöperate with spaced lugs 18 provided on the upper portion of the casing. The lugs 16 of the closure cap being adapted to be alined with the spaces between the lugs 17 and the lugs brought into locking engagement by a partial rotation of the cap. The cap is provided with a plurality of spring members 19 adapted to engage with the top of the stopper at their outer ends and hold the stopper in place. The outer ends of the spring members 19 are adapted to rest in a groove 20 formed in the upper face of the stopper. As will be understood the spring members 19 exert a pressure between the stopper and cap and act to maintain the locking lugs of the closure cap in locking relation with the lugs 18 of the body.

The casing is provided with a detachable bottom portion 21, said bottom portion having inclined slots 22 formed in the side portions thereof to coöperate with lugs 23 on the lower portion of the casing. Connected to the bottom 24 is an elliptic spring 25, the upper leaf of the spring having secured thereto a circular pad of felt or similar material, said pad being slightly dished to conform to the curvature of the bottom of the inner vessel and providing a yielding support therefor.

As will be appreciated a very simple, compact form of device is provided for the convenient transportation of micro-organisms, the device embodying means for maintaining the micro-organisms or bacteria at a substantially constant temperature favorable to the preservation thereof for a considerable period of time and also to exclude light from said organisms so that the bacteria will be protected against destructive influences and the growth and multiplicity promoted during transportation. In practice the heat storing liquid is heated to a temperature slightly above that to be maintained and then introduced into the vessel. The stopper is fitted into the mouth of the vessel, and the test tube, in which has been placed the micro-organisms and culture medium, is inserted into the vessel through the openings in the cover, the test tube being readily removable without removing the stopper to add to, remove or inspect the contents thereof. The test is provided with the usual form of stopper.

What I claim is:

1. A bacteria preserving device comprising a double walled receptacle adapted to contain heat storing liquid, a removable stopper for the mouth of the vessel, and a test tube for bacteria adapted to be supported to extend within said receptacle and into the body of heat storing liquid therein, the stopper being provided with an elevated portion adjacent the opening passing therethrough constructed and arranged to support the upper end of the test tube above the main portion of the surface of the stopper, and a resilient member secured to the stopper and overlying the upper end of the test tube for retaining the same in position.

2. A bacteria preserving device comprising a double walled vessel adapted to contain heat storing liquid, a stopper for the mouth of the vessel, said stopper being provided with an opening extending through the same, a bacteria test tube adapted to be removably seated in the opening of the stopper to extend to the interior of the vessel, projecting portions on the stopper at the top thereof upon which the upper flanged mouth of the test tube is adapted to rest, and means on the stopper to hold the test tube pressed against said supporting lugs.

3. A bacteria preserving device comprising a double walled vessel adapted to contain heat storing liquid, a stopper for the mouth of the vessel, said stopper being provided with an opening extending through the same, a bacteria test tube having a flanged mouth adapted to be removably seated in the opening of the stopper to extend to the interior of the vessel, projecting portions on the stopper at the top thereof upon which the upper flanged mouth of the test tube is adapted to rest, and a resilient locking member supported on the stopper at one end and adapted to be engaged with the upper end of the test tube to hold the same in position.

4. A bacteria preserving device comprising a double walled vacuum vessel adapted to contain heat storing liquid, a stopper for the mouth of the vessel, said stopper being provided with an opening extending centrally through the same, a bacteria test tube adapted to be removably seated in the opening of the stopper to extend to the interior of the vessel, and a plurality of spaced spring fingers extending from the bottom of the stopper adapted to yieldably engage the test tube at their free end portions and hold the same in position.

5. A bacteria preserving device comprising a double walled vacuum vessel adapted to contain heat storing liquid, a stopper for the mouth of the vessel, said stopper being provided with an opening extending through the same, a bacteria test tube adapted to be removably seated within the said opening of the stopper to extend to the interior of the vessel, said test tube having an upper portion adapted to rest upon an upper portion of the stopper, and a device pivotally connected with the stopper and adapted to be engaged with the upper end of the test tube to hold the same locked in position.

6. A bacteria preserving device comprising a double walled vacuum vessel adapted to contain heat storing liquid, a stopper for the mouth of the vessel, said stopper being provided with an opening extending through the same, a bacteria test tube adapted to be removably seated in the opening of said stopper to extend to the interior of the vessel within the body of heat storing liquid, and spaced engaging devices depending from the lower face of the stopper and contacting with the test tube for retaining and centering said tube in position.

7. A receptacle for the purpose described comprising an insulated vessel adapted to contain heat storing liquid having an opening at its upper end and a stopper therefor, a test tube removably supported by said stopper and having a portion projecting into the body of heat storing liquid, a casing surrounding the vessel, substantially elliptical resilient means at the bottom of the casing constituting a resilient support for the vessel, and a removable closure, having stopper engaging portions contacting with the stopper for retaining the same in position when the closure is attached to the casing, substantially as described.

8. A bacteria preserving device comprising a double walled vacuum vessel having a relatively large mouth and adapted to contain heat storing liquid, a stopper having a dead air space and being provided with an opening extending therethrough, surrounded by the dead air space, a bacteria test tube removably seated in the opening in the stopper and extending to the interior of the vessel in spaced relation with the walls thereof, substantially as described.

9. A bacteria preserving device comprising a double walled vacuum vessel having a relatively large mouth adapted to contain heat storing liquid, a stopper for the mouth of the vessel, said stopper having a dead-air space and being provided with an opening extending therethrough surrounded by the dead-air space, a bacteria test tube adapted to be removably seated in the opening in the stopper, and to extend to the interior of the vessel in spaced relation with the walls thereof, and a metallic casing inclosing the vessel, substantially as described.

10. A bacteria preserving device comprising a double walled vacuum vessel adapted to contain heat storing liquid, a stopper for the mouth of the vessel, said stopper being provided with an opening extending through the same, a bacteria test tube adapted to be removably seated in the opening of the stopper and to extend to the interior of the vessel, within the body of heat storing liquid, and means depending from the lower face of the stopper for centering and maintaining the tube in position.

11. A bacteria preserving receptacle comprising a vessel having heat insulated walls and a suitable mouth, the said receptacle being adapted to receive a heat storing liquid, a stopper having a heat insulated portion surrounding an opening passing therethrough, well within its borders, a bacteria test tube extending through the opening in the stopper and into the heat storing liquid within the receptacle, said tube being spaced a considerable distance from the walls of the receptacle, for the purpose described.

In testimony whereof I hereunto affix my signature in the presence of two witnesses.

LOUIS CHARLES ROSENBERG.

Witnesses:
   CALVIN T. MILANS,
   GEO. D. RILEY.